Sept. 29, 1970 B. KAZAN 3,531,647
DEVICE AND PROCESS FOR REDUCTION BACKGROUND LIGHT
IN SOLID STATE STORAGE PANELS
Filed Sept. 29, 1966
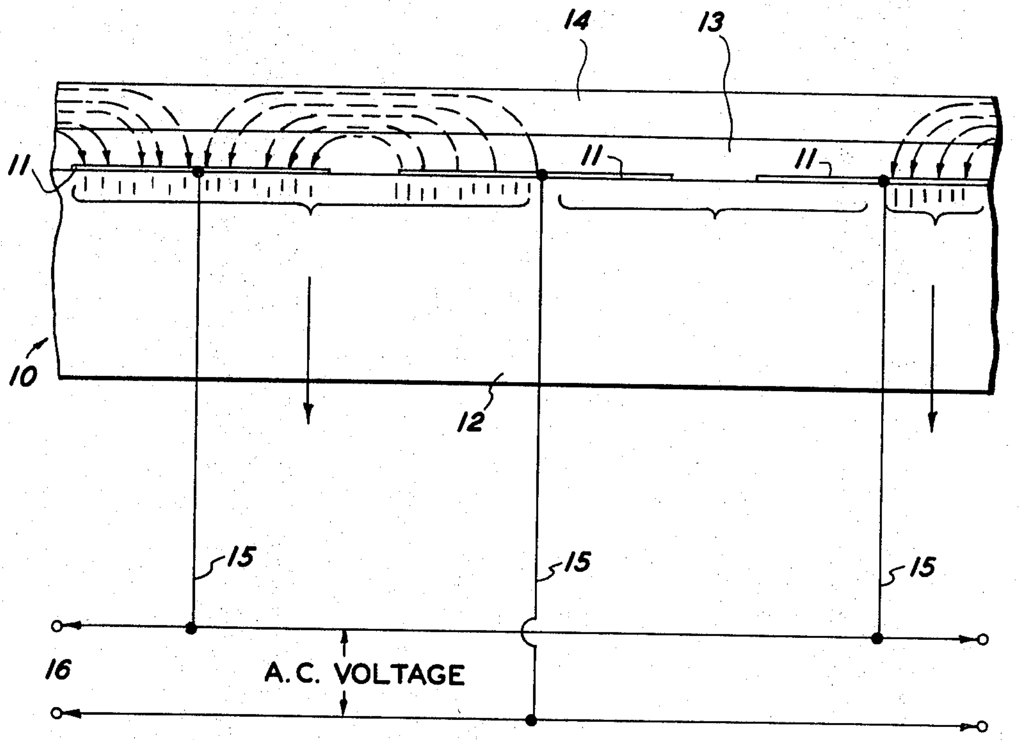
INVENTOR.
BENJAMIN KAZAN
BY
Ronald Zibelli
ATTORNEY 3,531,647

DEVICE AND PROCESS FOR REDUCTION OF BACKGROUND LIGHT IN SOLID STATE STORAGE PANELS

Benjamin Kazan, Pasadena, Calif., assignor to Xerox Corporation, Rochester, N.Y., a corporation of New York Filed Sept. 29, 1966, Ser. No. 582,860
Int. Cl. H01l 17/00
U.S. Cl. 250—213 19 Claims

ABSTRACT OF THE DISCLOSURE

This application relates to a process for reducing the background light emitted from solid state storage panels wherein the electroluminescent material is aged by subjecting said material to a high frequency alternating current voltage to reduce light emission from those portions of the electroluminescent material adjacent the electrode edges. Optionally, to accelerate the aging process, the electroluminescent material may be simultaneously exposed to a high humidity environment.

This invention relates to electroluminescent devices and, in particular, to electroluminescent devices of the type adapted to store electrical signals. Additionally, the present invention relates to a method for the reduction of background light emitted from a solid state storage panel.

At present, a variety of solid state imaging devices are known but have not received significant utilization because of the practical problems encountered in their operation. The storage action of these devices depends on one of several different phenomenon including the slow decay of conductivity after excitation of a photoconductive material, the hysteresis effect in photoconductors and optical feed-back. Some of the factors operating against the practical use of such solid state imaging devices include low sensitivity to input radiation, low light output, poor or no half-tones, difficulty in providing image erasure, and a relatively low ratio of output light to background light.

One type of solid state imaging device involves a display panel consisting of a layer of variable impedance material in series with a layer of electroluminescent material as described in the patents to Benjamin Kazan U.S. 2,768,310 issued Oct. 23, 1956 and 2,949,537 issued Aug. 16, 1960. As described therein, the image is produced by the increase in conductivity of the portions of the variable impedance material, in this instance a photoconductive material, against which incident radiation impinges. Such conductivity increase produces a corresponding luminescence in the adjoining portion of the electroluminescent material.

In copending application Ser. No. 582,856 filed Sept. 29, 1966, a continuation-in-part application of Ser. No. 514,860, filed Dec. 20, 1965, now abandoned, there is disclosed a new and improved electroluminescent storage device which is not subject to defects which plague the operation of prior known storage panels. The storage device involves a display panel comprising a plurality of spaced electrodes on one surface of a supporting substrate, a layer of electroluminescent material overlying the plurality of electrodes and forming a part of the electrical connection between the electrodes, and a layer of a field effect semiconductor material overlying the layer of electroluminescent material and forming a succeeding part of the electrical connection between the electrodes, the panel having a charge retaining surface adapted to store an electrostatic charge pattern thereon. Such a panel is used in combination with means for depositing a charge pattern on the charge retaining surface. In operation, an alternating current voltage is applied between the spaced electrodes which is sufficient to induce electroluminescence when the field effect semiconductor material is at its low impedance state. It was found that the deposition of an electrostatic charge on the charge retaining surface of the display panel can be used to control the flow of current from electrode to electrode. Deposition of electrostatic charge increases the impedance of the field effect semiconductor thereby reducing or interrupting the flow of current in adjacent areas. Reduction of current flow causes a corresponding reducation in light output from the electroluminescent layer resulting in a half-toned response. If the current is lowered below that which is sufficient to induce electroluminescence, luminescence will not occur and that particular portion of the storage device will appear dark. Conversely, the impedance is lowered and current flow increased as the charges are neutralized or removed from the surface. By selectively placing or modifying a charge pattern on the surface of the display panel an image can be produced and stored for long periods of time.

In the patent to Benjamin Kazan 2,905,849 issued Sept. 22, 1959, there is shown a storage device having a target comprising a transparent support plate having on one surface thereof a plurality of spaced transparent electrodes, the transparent electrodes being covered in turn by a layer of ferroelectric material which in turn is covered by a plurality of spaced conducting elements. Input signals to the ferro-electric material caused a change in the impedance of that layer resulting in a modification of the voltage drop across the electroluminescent layer. Sufficient increase in the impedance of the ferro-electric layer will cause complete termination of the light emitted from the electroluminescent layer.

In solid state intensifier panels employing interdigital electrode structures, as in the storage panels previously mentioned, one of the serious problems is that when the panel is in the unexcited or erased condition and no input image is projected, a relatively high level of background light is emitted from the phosphor screen on the viewing side. This background light is emitted from the electroluminescent material along the edges of the electrode strips due to the existence of high local fringing fields at these edges. Such fields exist even when the current flow between electrodes is relatively small because of the high impedance state of the variable impedance material. The background light is sufficiently intense so as to seriously reduce the contrast when an image is projected onto the panel, the resulting contrast being on the order of 10:1 or less. That is, the ratio of output light to background light is approximately 10:1. Such a condition limits the contrast which can be obtained in a storage panel, and therefore, is highly undesirable.

As would be expected, it is desirable to have a solid state storage device which is not subjected to the aforementioned defect.

Accordingly, it is an object of this invention to provide a new and improved electroluminescent storage device.

A further object of this invention is to provide an imaging device which has a high ratio of output light to background light.

A further object of the present invention is to provide a method for the reduction of background light on solid state storage panels which permits higher contrast ratios to be obtained.

The above and still further objects, features, and advantages of the present invention will become apparent upon consideration of the following detailed disclosure of specific exemplary embodiments of the invention.

The above and still further objects may be accomplished in accordance with the present invention by aging selective portions of the electroluminescent layer before the variable impedance layer is deposited. In the preparation of the storage panel contemplated by this invention, a supporting substrate is provided and a plurality of spaced electrodes are disposed on one surface thereof. A layer of electroluminescent material is then deposited over the spaced electrodes. Prior to the deposition of the variable impedance layer, the panel is subjected to high frequency alternating current voltage between the electrodes resulting in a relatively intense light being produced at the electrode edges. The panel is maintained in this state for a period of time sufficient to significantly reduce the light output of the electroluminescent layer adjacent the electrode edges. Optionally, the aging process can be conducted after the variable impedance material has been deposited if said material is maintained in a high impedance state. As a result of this process, the light emission from the electroluminescent material adjacent the electrode edges is significantly reduced while the electroluminescent material above the electrodes is unaffected in its efficiency or brightness. To further accelerate this aging process, the phosphor may be exposed to a high-humidity environment. Subsequent to this aging process, the variable impedance material is deposited upon the aged electroluminescent material layer, and the panel (i.e., the spaced electrodes) connected to an appropriate alternating current source and subjected to input information whereby a high contrast output image is obtained on the storage device from phosphor material above the electrodes in areas where the variable impedance material is in a low impedance condition.

The nature of the invention will be more easily understood when it is considered in conjunction with the accompanying drawing wherein the figure is an enlarged fragmentary sectional view of an exemplary imaging device of the present invention.

It should be understood that in the figure the thickness of the layers, electrodes, etc., as well as other dimensions, have been greatly exaggerated to show the details of construction.

Referring to the figure, the imaging device 10 comprises a plurality of spaced electrodes 11 mounted on a supporting substrate 12. Contacting each of the electrodes 11 is an electroluminescent material 13; specifically, the electroluminescent material 13 forms a layer overlying each of said electrodes 11. Electrical connections 15 are made to the electrodes 11 to enable the application of a voltage therebetween. Alternating electrodes are connected to one side of an alternating current voltage source 16 and the intermediate electrodes are connected to the other side of the source. After the aging process, as will hereinafter be described, a layer of variable impedance material 14 is disposed over electroluminescent material 13.

If it is desired to view the storage device from the side opposite the variable impedance material side then supporting substrate 12 and spaced electrodes 11 should be transparent. A suitable substrate-electrode combination is optically transparent glass overcoated with thin optically transparent electrodes of tin oxide. The transparent electrodes may be produced by applying tin oxide, produced by the reaction of vapors of stannic acid, water, and methanol, through a suitable mask. "Mylar" is also an acceptable transparent substrate.

If it is desired to view the stored image from the variable impedance material side of the panel, then the variable impedance material should be transparent or translucent. In actuality, because of the thinness of the variable impedance material layer the difference between transparency and translucency is so slight as to be immaterial. In this latter structure, the panel can be fabricated on an opaque insulating base using opaque, for example metallic, electrodes. Suitable translucent variable impedance materials include thin layers of zinc oxide, lead oxide, cadmium oxide, Rochelle salt, etc.

The electroluminescent layer 13 can be formed of any known electroluminescent phosphor such as manganese activated zinc sulfide, copper activated zinc sulfide, etc. The electroluminescent material is preferably mixed with a transparent dielectric binder material, such as an epoxy or polyvinyl chloride resin, and then applied, by any known means, over the spaced electrodes.

In accordance with the present invention the panel is now subjected to a high frequency alternating current voltage which is passed between the electrodes for a period of time sufficient to reduce the light output of the electroluminescent layer adjacent the electrode edges. The time required for this aging process can vary with the thickness of the electroluminescent layer and with the particular material utilized; however, in general, the aging process is conducted for about one to two hours to about two to four days, depending on the aforementioned factors as well as the applied voltage and the degree of aging desired.

The degree of aging is proportional to the frequency and magnitude of the alternating current. Increasing these factors, separately, or together, will cause the aging to be conducted in a shorter period of time. Conversely, when using a lower voltage, the aging process must be conducted for a longer time. The degree of aging is also proportional to the spacing between the interdigital electrodes. If the distance is increased, to age the same material in the same amount of time it will be necessary to increase the voltage or, at least, one of the other factors to compensate for the increase in impedance between adjacent electrodes. As previously noted, the aging process can be accelerated by placing the unit, during the aging process, in a high-humidity environment. This can be achieved by aging the panel in a closed container having a water-containing vessel therein so as to have an environment having substantially 100% relative humidity.

The variable impedance material can now be deposited upon the aged electroluminescent layer by any known process. The variable impedance material can be a ferroelectric material, such as Rochelle salt, barium titanate, barium strontium titanate; a field effect semiconductor material, such as zinc oxide, lead oxide, cadmium oxide, and cadmium sulfide; a photoconductor, such as cadmium selenide, selenium, selenium alloys with minor amounts of arsenic or tellurium, and activated/or sensitized forms of the aforementioned materials; or any other material which can advantageously be utilized as a control layer in the production of an electroluminescent storage device. With respect to the term "field effect semiconductor" reference is made to concurrently filed application Ser. No. 582,856, filed Sept. 29, 1966, which is incorporated herein by reference.

The following example is given to enable those skilled in the art to more clearly understand and practice the invention. It should not be considered as a limitation upon the scope of the invention but merely as being illustrative thereof.

A glass plate about 12" long and about 12" wide and 3/16" thick has a grid of transparent NESA glass conducting electrode strips formed thereon. Each NESA electrode strip extends the width of the plate and has a width of about 10 mils. The electrode strips are mounted parallel to each other with a uniform spacing of about 10 mils. Coated over the electrode strips on the glass plate is a layer of about 2 mils thickness of zinc sulfide phosphor in an epoxy resin binder. Alternate conducting electrodes are connected to one side of an alternating current voltage source and the intermediate conducting electrodes are connected to the other side of the voltage source. Prior to the aging process, the average edge light from the phosphor at 600 volts, 600 cycles is greater than 0.1 ft. lambert. High frequency alternating current of about 600 volts at about 20 kilocycles per second is now applied between the electrodes for several days, the relative humidity in the aging chamber being approximately 100%. After this aging process, the background light is reduced to less than 0.01 ft. lambert. The panel is now completed by the deposition of a zinc oxide field effect semiconductor layer. The background light in the unexcited or dark pictured areas is found to be significantly reduced while the light levels in the bright areas is found to be at its initial high level. As is apparent from the figures presented, the contrast between image and non-image areas is increased by at least an order of magnitude.

For a discussion of the operation of storage devices utilizing an electroluminescent panel of the type contemplated by this invention, reference is made to the patents to Kazan 2,768,310 and 2,905,849 and to copending application Ser. No. 582,856 filed Sept. 29, 1966. Portions of the aforementioned references which are necessary to a complete understanding of the operation of the respective storage panels are incorporated herein by reference.

The electrode strips employed are merely convenient means for accurately selecting the length and cross-sectional area of the current path. Thus, by decreasing spacing between adjoining electrodes and/or by increasing the thickness of the variable impedance material coating, one can increase the current therethrough for a given set of conditions. Additionally, the electrode strips may have any configuration as long as the modification of the impedance of the variable impedance layer continues to control the curent flow between the electrodes.

In certain applications, it is appropriate to provide a layer of opaque insulating material positioned between the electroluminescent material and the variable impedance material. The opaque insulating material is formed, for example, of lampblack in a suitable binder and sprayed onto the electroluminescent material. The opaque layer prevents light-feed back from the electroluminescent material to the variable impedance material should the latter material also be a photoconductor which is responsive to the light emitted during luminescence.

In summary, this invention relates to a process for reducing the background light emitted from a solid state storage panel wherein the electroluminescent material, after deposition upon the electrode supporting substrate, is aged in selective portions by passing a high frequency high voltage alternating current between the electrodes. The panel is maintained under these conditions for a period of time sufficient to significantly reduce the light output of the electroluminescent layer adjacent the electrode edges. The construction of the panel is then completed by the deposition of the variable impedance material. Panels produced according to this process have significantly higher ratios of emitted image light to emitted background light, generally on the order of 100:1 or higher. As should be apparent from this disclosure, the solid stage storage panel herein disclosed and claimed are different from prior panels, such as the ones disclosed by Kazan et al. in 2,768,310 in that the electroluminescent material has been modified, by the aforesaid aging process, whereby the emitted light from the electroluminescent material adjacent the electrode edges is significantly reduced.

While the invention has been described with reference to preferred embodiments thereof, it will be understood by those skilled in the art that various changes in form and details may be made without departing from the true spirit and scope of the invention.

It should be understood that the present invention is not dependent upon the exact nature of the electroluminescent materials or the variable impedance materials employed, rather any suitable material or structure can be employed, provided the advantageous results of this invention are not adversely affected.

All substitutions, additions, and modifications of the present invention, or to which the present invention is readily susceptible without departing from the spirit and scope of this disclosure, are considered part of the present invention.

What is claimed is:

1. An electroluminescent device comprising a plurality of spaced electrodes, electroluminescent material overlying said electrodes the portions of said electroluminescent material adjacent the edges of said electrodes having modified physical characteristics to emit substantially less light upon imaging excitation than the remaining portions of said electroluminescent material, and a layer of variable impedance material overlying said electroluminescent material, whereby upon imaging excitation there is obtained an output image having increased contrast between emitted image light from said remaining portions of said electroluminescent material and emitted background light from said portions of said electroluminescent material adjacent the edges of said electrodes.

2. The electroluminescent device of claim 1 wherein said remaining portions of the electroluminescent material remain substantially unaffected in their ability to emit light.

3. The electroluminescent device of claim 1 wherein the variable impedance material is a photoconductor.

4. The electroluminescent device of claim 1 wherein the variable impedance material is a field effect semiconductor material and said device has a charge retaining surface.

5. The electroluminescent device of claim 4 wherein field effect semiconductor material is zinc oxide.

6. The electroluminescent device of claim 1 wherein the variable impedance material is a ferro-electric material.

7. In an electroluminescent device comprising a plurality of spaced electrodes, electroluminescent material overlying said electrodes, and a layer of variable impedance material overlying said electroluminescent material, the improvement which comprises utilizing an electroluminescent material portions of which adjacent the edges of said electrodes having modified physical characteristics to emit substantially less light upon imaging excitation than the remaining portions of said electroluminescent material, whereby upon imaging excitation there is obtained an output image having increased contrast between emitted image light from said remaining portions of said electroluminescent material and emitted background light from said portions of said electroluminescent material adjacent the edges of said electrodes.

8. The electroluminescent device of claim 1 wherein said electroluminescent material is in layer form over said spaced electrodes.

9. The electroluminescent device of claim 1 wherein there is a segment of electroluminescent material overlying each of said spaced electrodes, said segments of electroluminescent material being separated by intervening segments of insulating material.

10. A method of producing an electroluminescent device comprising providing a supporting substrate having a plurality of spaced electrodes on one surface thereof, depositing electroluminescent material over said spaced electrodes, aging said electroluminescent material so that its physical ability to emit light from selected portions thereof is substantially reduced, and depositing variable impedance material over said electroluminescent material.

11. The method of claim 10 wherein the electroluminescent material is aged prior to the deposition of the variable impedance material.

12. The method of claim 10 wherein the variable impedance material is deposited prior to the aging operation, said variable impedance material being held in a high impedance state during said aging step.

13. The method of claim 10 wherein the device is held in a high relative humidity environment during said aging step.

14. The method of claim 10 wherein those portions of said electroluminescent material having reduced ability to emit light are adjacent edge portions of said spaced electrodes, the remaining portion of said electroluminescent material remaining substantially unaffected in its ability to emit light.

15. A method of producing an electroluminescent device comprising providing a supporting substrate having a plurality of spaced electrodes on one surface thereof, depositing electroluminescent material over said spaced electrodes, passing a high frequency alternating current voltage through said electroluminescent material for a period of time sufficient to reduce the physical capability of said electroluminescent material to emit light from those portions of said material adjacent edge portions of said spaced electrodes, and thereafter depositing a layer of variable impedance material over said physically modified electroluminescent material.

16. The method of claim 15 wherein the device is held in a high relative humidity environment during passage of said high frequency alternating current voltage through said electroluminescent material.

17. An electroluminescent device comprising a supporting substrate, a plurality of electrodes spaced apart on the surface of said supporting substrate, alternate electrodes being adapted for connection to one side of an alternating current potential source with the intermediate electrodes being adapted for connection to the other side of said potential source, aged electroluminescent material overlying said electrodes, the portions of said aged electroluminescent material adjacent the edges of said electrodes having modified physical characteristics to emit substantially less light upon imaging excitation than the remaining portions of said electroluminescent material, and a layer of variable impedance material overlying said aged electroluminescent material for controlling current flow between adjacent ones of said electrodes during imaging excitation.

18. A method of producing an electroluminescent device comprising providing a supporting substrate having a plurality of spaced electrodes on one surface thereof, depositing electroluminescent material over said spaced electrodes, depositing a layer of variable impedance material over said electroluminescent material, passing a high frequency alternating current voltage through said electroluminescent material while holding said variable impedance material in a high impedance state for a period of time sufficient to reduce the physical capability of said electroluminescent material to emit light from those portions of said electroluminescent material adjacent edge portions of said spaced electrodes.

19. The method of claim 18 wherein the device is held in a high relative humidity environment during passage of said high frequency alternating current voltage through said electroluminescent material.

References Cited

UNITED STATES PATENTS

| | | | |
|---|---|---|---|
| 2,972,076 | 2/1961 | Van Santen et al. | 250—213 X |
| 3,083,262 | 3/1963 | Hanlet | 250—213 X |
| 3,248,550 | 4/1966 | Szepesi | 250—213 |
| 3,321,633 | 5/1967 | Carney | 250—213 |
| 3,344,279 | 9/1967 | Martel | 250—213 X |
| 3,441,736 | 4/1969 | Kazan et al. | 250—213 |

WALTER STOLWEIN, Primary Examiner

U.S. Cl. X.R.

340—173